United States Patent
Fujiura

(12) 
(10) Patent No.: US 6,181,510 B1
(45) Date of Patent: *Jan. 30, 2001

(54) OPTICAL DISK APPARATUS WITH SWINGABLE DISK TRAY HOLDER

(75) Inventor: Kazuo Fujiura, Tokyo (JP)

(73) Assignee: Kabushiki Kaisha Toshiba, Kawasaki (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/169,982

(22) Filed: Oct. 13, 1998

(30) Foreign Application Priority Data

Oct. 13, 1997 (JP) .................................................. 9-278981

(51) Int. Cl.7 .................................................. G11B 17/04
(52) U.S. Cl. .................................... 360/99.06; 369/75.2
(58) Field of Search .............................. 360/99.02, 99.06, 360/99.07, 75.2, 77.1, 77.2

(56) References Cited

U.S. PATENT DOCUMENTS 5,781,523 * 7/1998 Ozawa ................................. 369/77.1

* cited by examiner

Primary Examiner—A. J. Heinz
(74) Attorney, Agent, or Firm—Oblon, Spivak, McClelland, Maier & Neustadt, P.C.

(57) ABSTRACT

An optical disk apparatus is provided with a housing having an inlet/outlet port, a tray holder which is swingable inside the housing, with one end as a center, a tray which is slidably held inside the holder and which is pulled out from the holder through the inlet/output port for placement of a cartridge and is drawn into the holder after placement of the cartridge, a spindle motor, located at a position toward which the holder swings, for spinning the optical disk arranged in the cartridge, and a swinging mechanism for swinging the holder to bring the optical disk in the cartridge into engagement with the spindle motor after the tray is received inside the holder.

4 Claims, 8 Drawing Sheets

OPTICAL DISK APPARATUS WITH SWINGABLE DISK TRAY HOLDER

BACKGROUND OF THE INVENTION

The present invention relates to an optical disk apparatus comprising an improved structure for taking in a disk cartridge.

An optical disk apparatus has an inlet/outlet port formed in the front portion of a housing, and a tray arranged inside the housing and adapted to hold a disk cartridge placed thereon.

Also arranged inside the housing are a turntable for holding an optical disk, a spindle motor for rotating the turntable, an optical head mechanism for executing information processing with reference to the optical disk.

To take a disk cartridge into the optical disk apparatus, the tray is horizontally pulled out from the housing through the inlet/output port. After the disk cartridge is placed, the tray is drawn into the housing. Inside the housing, the tray is made to descend, with its horizontal posture maintained, in such a manner that the optical disk in the cartridge is mounted on the turntable coupled to the spindle motor. After the optical disk is mounted, it is spun in accordance with the rotation of the turntable. In the spinning state, the optical disk is scanned with a beam radiated from an optical head mechanism.

According to the conventional art, the tray holding the disk cartridge thereon and drawn into the housing is made to descend, with its horizontal posture maintained, in such a manner that the optical disk in the disk cartridge engages with the turntable. With this structure, the optical disk apparatus is required to provide an internal space for vertical movement of the disk cartridge, and is therefore inevitably large in size.

BRIEF SUMMARY OF THE INVENTION

The present invention has been made in consideration of the above circumstances, and an object of the present invention is to provide an optical disk apparatus capable of bringing an optical disk into reliable engagement with driving means, with no need to provide a wide space for the movement of the tray.

To attain this object, the present invention provides an optical disk apparatus comprising: a housing having an inlet/outlet port; a holder which is swingable inside the housing, with one end as a center; a tray which is slidably held inside the holder and which is pulled out from the holder through the inlet/output port for placement of a cartridge and is drawn into the holder after placement of the cartridge; driving means, located at a position toward which the holder swings, for spinning the optical disk arranged in the cartridge; and swinging means for swinging the holder to bring the optical disk in the cartridge into engagement with the driving means after the tray is received inside the holder.

The present invention also provides an optical disk apparatus comprising: a housing having an inlet/outlet port; a holder which is swingable inside the housing, with one end as a center, the other end of the holder being located close to the inlet/outlet port and serving as a swingable end; a tray which is slidably held inside the holder and which is pulled out from the holder through the inlet/output port for placement of a cartridge and is drawn into the holder after placement of the cartridge; driving means, located at a position toward which the holder swings, for spinning the optical disk arranged in the cartridge; and swinging means for swinging the holder to bring the optical disk in the cartridge into engagement with the driving means after the tray is received inside the holder.

The present invention further provides an optical disk apparatus comprising: a housing having an inlet/outlet port; a holder which is swingable inside the housing, with one end as a center, the other end of the holder being located close to the inlet/outlet port and serving as a swingable end; a tray which is slidably held inside the holder and which is pulled out from the holder through the inlet/output port for placement of a cartridge and is drawn into the holder after placement of the cartridge; driving means, located at a position toward which the holder swings, for spinning the optical disk arranged in the cartridge; and swinging means for swinging the holder to bring the optical disk in the cartridge into engagement with the driving means after the tray is received inside the holder, the driving means being inclined at an angle corresponding to an inclination angle of the holder that is in the swung state.

With this structure, the space needed for the movement of the holder is about one half of the corresponding space of the prior art, wherein the holder is vertically moved to engage the optical disk with the driving means, while maintaining the horizontal posture of the holder. Accordingly, the apparatus is small in size as a whole.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

DETAILED DESCRIPTION OF THE INVENTION

An embodiment of the present invention will now be described with reference to the accompanying drawings.

Figure 1:
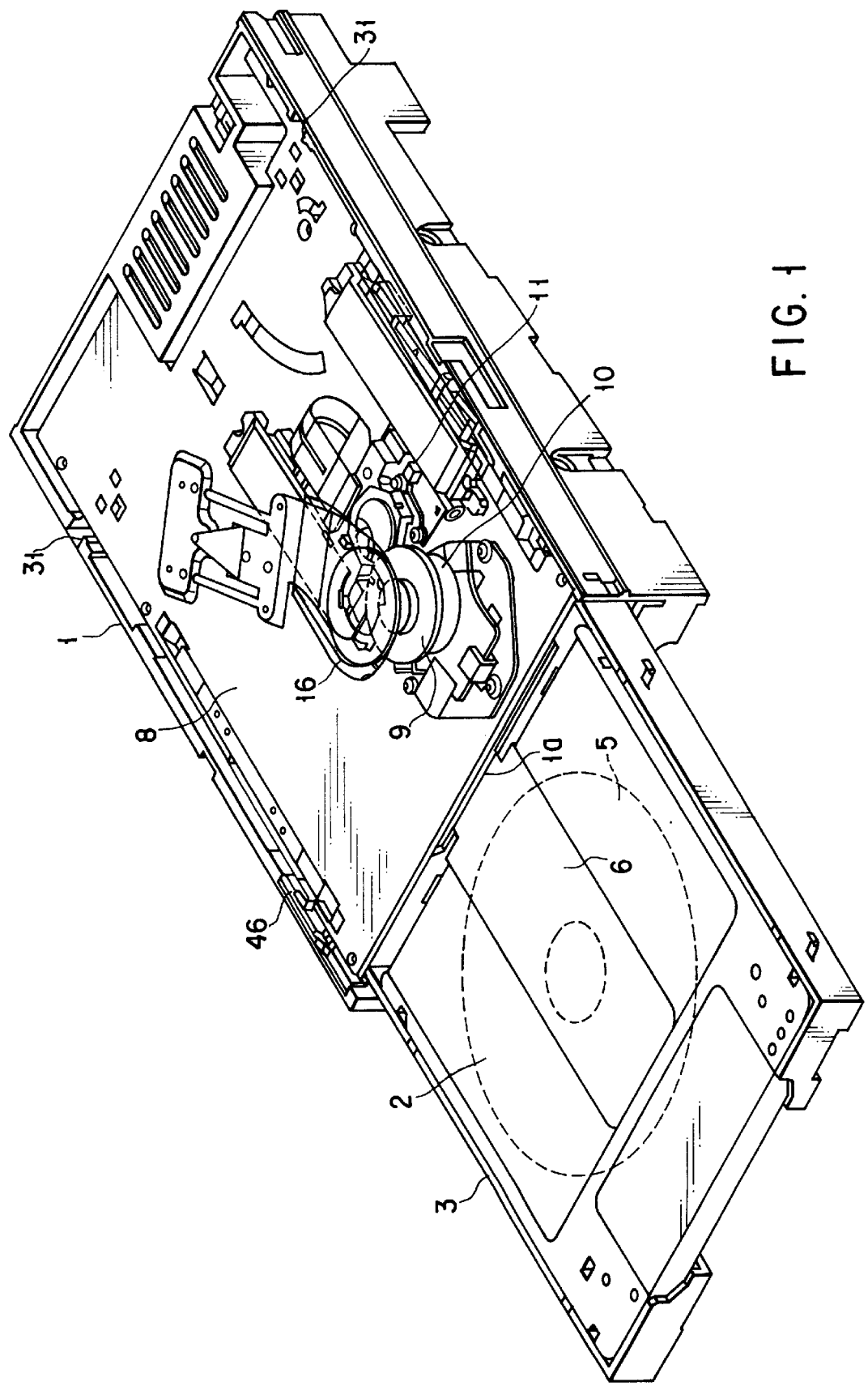
FIG. 1 is a perspective view of an optical disk apparatus according to one embodiment of the present invention.

FIG. 1 is a perspective view of an optical disk apparatus.

In FIG. 1, reference numeral 1 shows a base chassis constituting the housing of the optical disk apparatus. A tray holder 8 is provided inside the base chassis 1. The tray holder 8 holds a tray 3 (i.e., a tray means) in such a manner that the tray 3 can be advanced or retreated. An inlet/outlet port 1a is formed in the front wall of the base chassis 1 so as to allow passage of the tray 3. The front end of the tray holder 8 is opposed to the inlet/outlet port 1a in the vicinity thereof. The tray 3 is adapted to hold a cartridge 2 placed thereon.

The cartridge 2 contains an optical disk 5 with reference to which information is written or read. The cartridge 2 has an opening/closing shutter 6. When the cartridge 2 is inserted into the tray holder 8, the shutter 6 is opened by an opening mechanism (not shown), thereby exposing the optical disk 5.

A turntable 9, on which the optical disk 5 is mounted, is arranged inside the base chassis 1. A spindle motor 10, serving as a driving means for spinning the turntable 9, is located under the turntable 9. A lens actuator assembly 11, by which the optical disk 5 is scanned with a beam in the radial direction, is located behind the spindle motor 10.

The base chassis 1 has recesses 31 formed in the side walls thereof. The recesses 31 are located on the inner side of the rear portions of the walls. The tray holder 8 has its bosses 29 inserted in the recesses 31, and is rotatably supported thereby.

Figure 2:
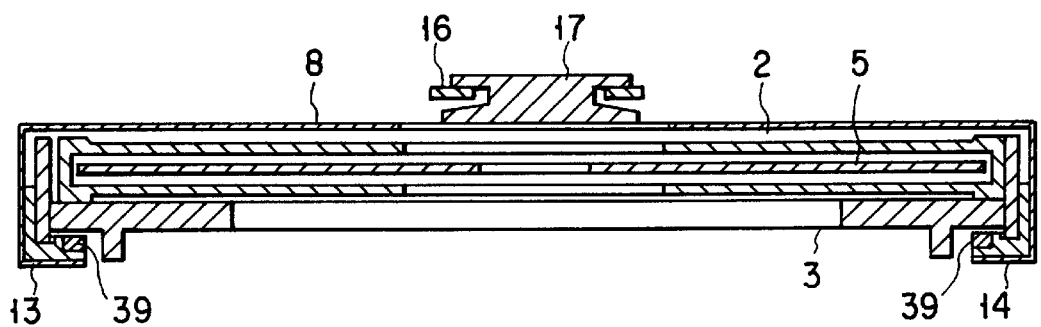
FIG. 2 shows a longitudinal section of the optical disk apparatus.

FIG. 2 shows a longitudinal section of the optical disk apparatus.

The lower portions of the side walls of the tray holder 8 are bent inward and extends horizontally. These horizontal portions serve as rack receiving faces 8a. Slide racks 13 and 14 are slidably arranged on the upper side of the rack receiving faces 8a. A spring member 16 is provided on the upper surface of the tray holder 8. A clamper 17, which is adapted to push and hold the optical disk 5 on the turntable 9 of the spindle motor 10, is held at one end of the spring member 16.

Figure 3:
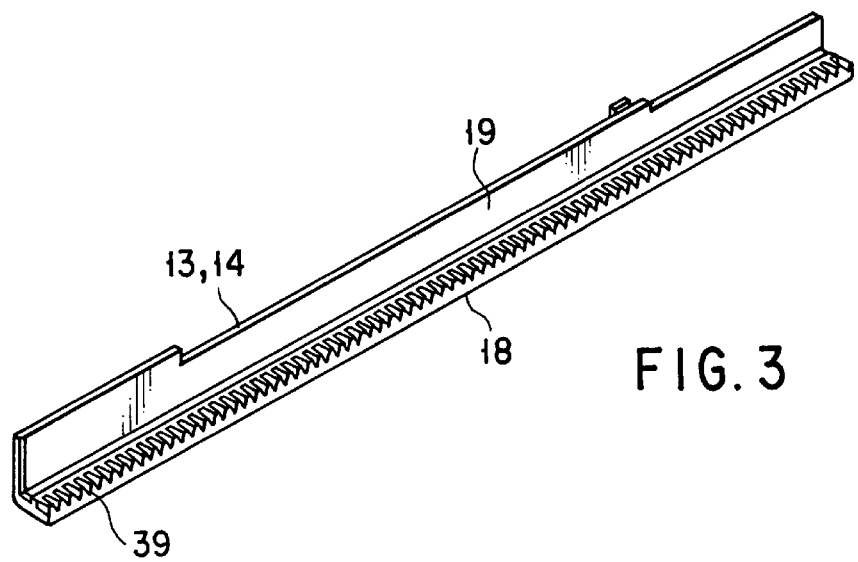
FIG. 3 is a perspective view of a slide rack.
Figure 4:
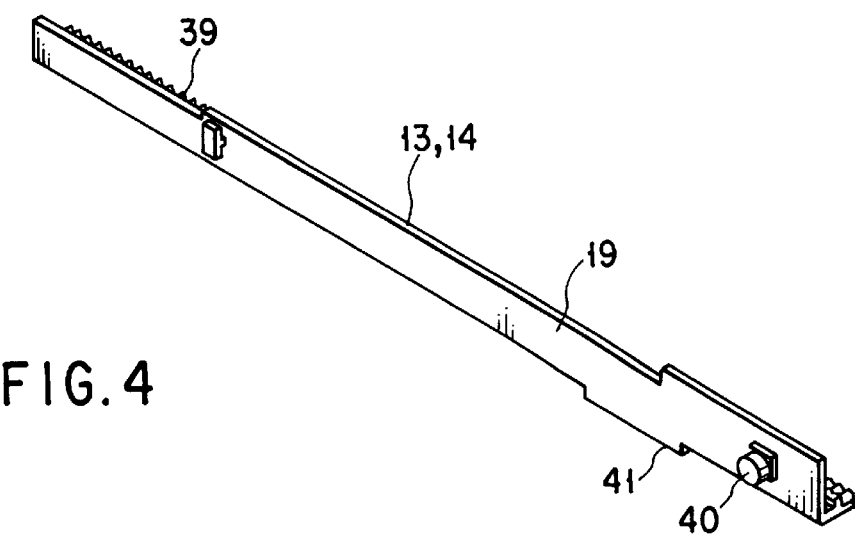
FIG. 4 is a perspective view in which the slide rack of FIG. 3 is looked at from a different angle.

FIGS. 3 and 4 are perspective views in which the slide rack 13 (14) is looked at from different directions.

The slide rack 13 (14) has a substantially "L"-shaped cross section and is made up of a bottom section 18 and an upright section 19. The bottom section 18 has a rack portion 39 formed on the upper side thereof. The upright section 19 has a boss 40 (i.e., a projection) formed at the front end portion thereof. The boss 40 is located on the outer side of the upright section 19. A rib 41 is projected from the lower side of the bottom section 18 of the slide rack 13 (14) in such a manner that the rib 41 is located in the rear of the boss 40.

Figure 5:
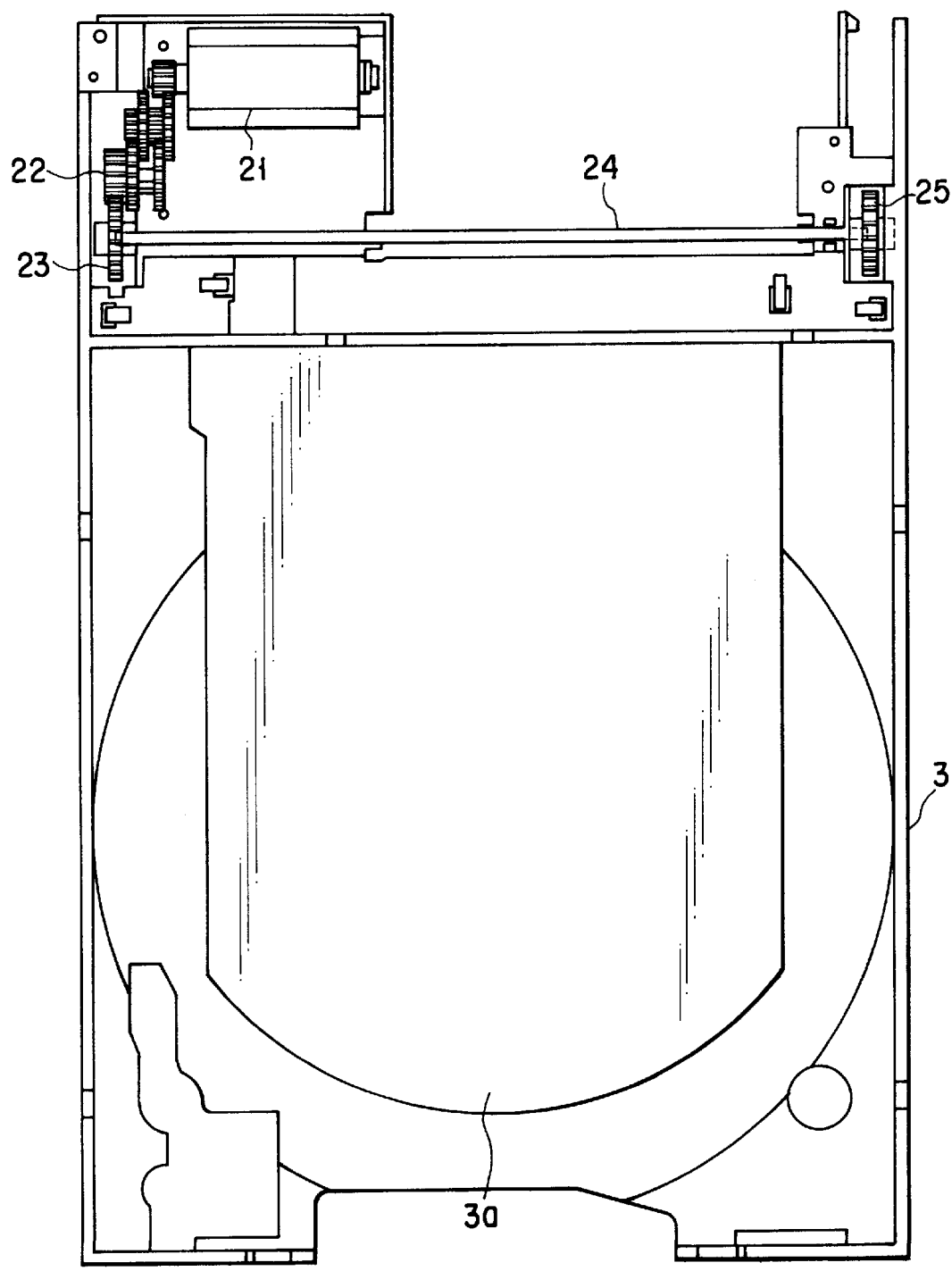
FIG. 5 is a plan view of a tray.

FIG. 5 is a plan view of the tray 3.

The tray 3 has a placement portion 3a on which the cartridge 2 is placed. A driving motor 21, which is a reversible motor, is arranged at the rear end of the tray 3.

A first driving gear 23 is connected to the driving motor 21 through a gear train 22, and a second driving gear 25 is connected to the first driving gear 23 through a shaft 24. The first and second driving gears 23 and 25 are in mesh with the rack portions 39 of the slide racks 13 and 14, respectively.

Figure 6:
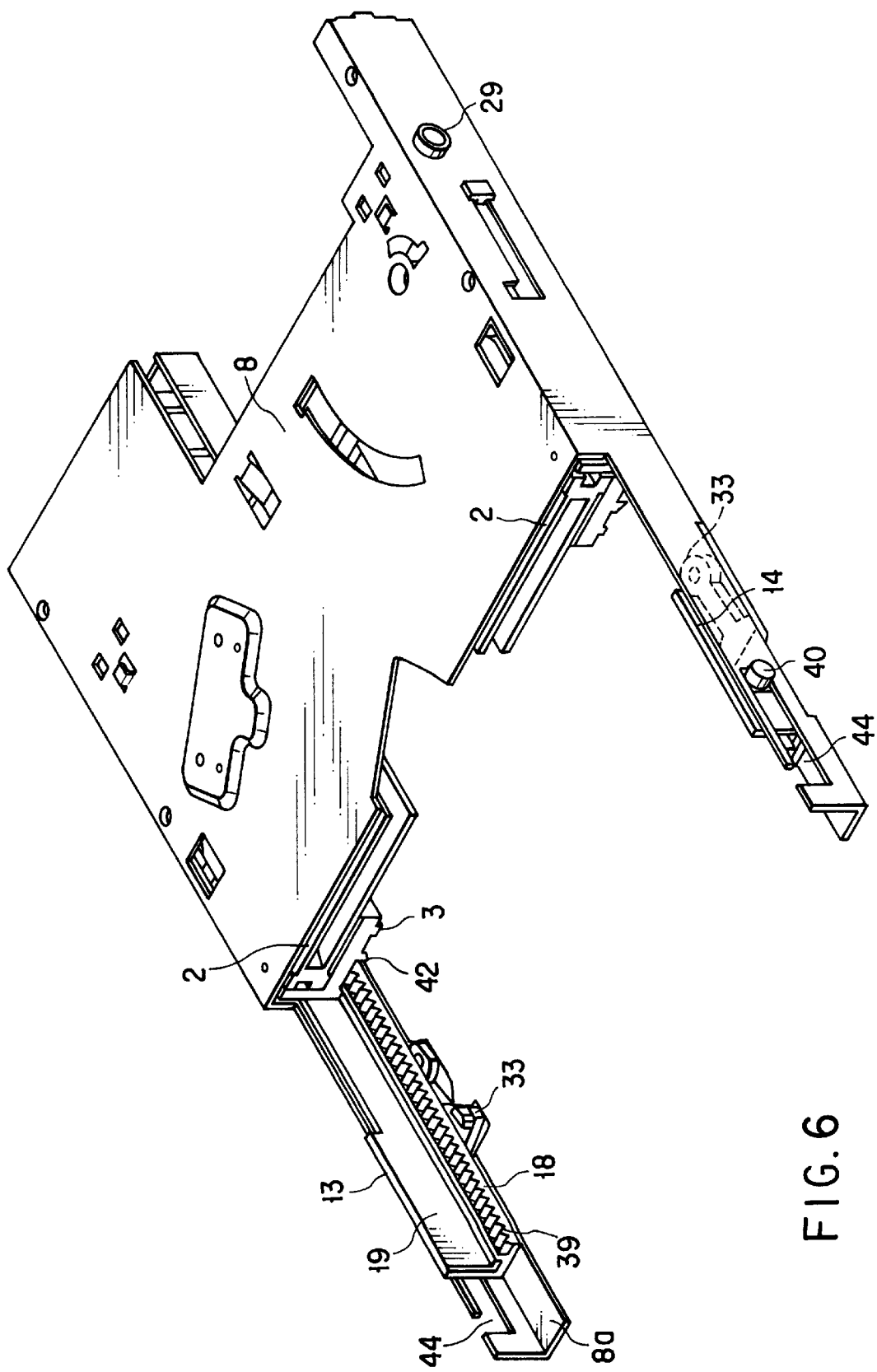
FIG. 6 is a partially-cutaway perspective view of a tray holder.

FIG. 6 is a partially-cutaway perspective view of the tray holder 3 and illustrates how the tray is held.

The bosses 29 are projected from the rear end portions of the side walls of the tray holder 8. The tray holder 8 is rotatably supported by inserting its bosses 29 in the recesses 31, which are formed in the inner sides of the rear portions of the side walls of the base chassis 1. The front end of the tray holder 8 is swingable, with the bosses 29 as a center.

Switch levers 33 are rotatably provided on the rack receiving faces 8 of the tray holder 8. Lower ribs 42, which restrict the rotation of the switch levers 33, are projected from the respective side portions of the bottom surface of the tray 3. Slide grooves 44 are formed in the front end portions of the side walls of the tray holder 8. The bosses 40 of the slide racks 13 and 14 are inserted in the slide grooves 44 and are slidable therein.

Figure 7:
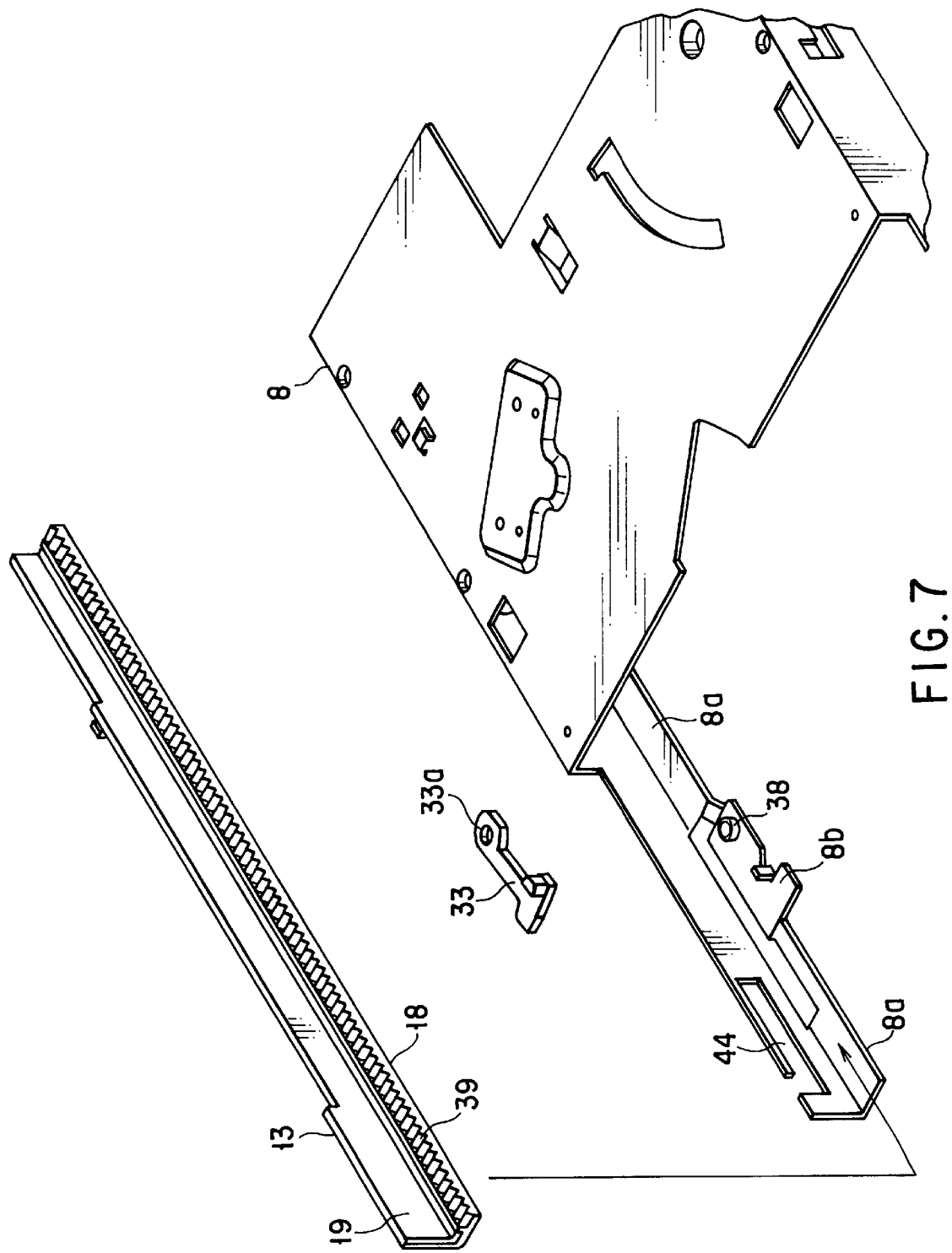
FIG. 7 is a perspective view showing the tray holder in an exploded manner.

FIG. 7 is an exploded perspective view showing the structure for attaching a switch lever 33.

An attachment surface 8b for attaching the switch lever 33 is formed on the rack receiving face 8a of the tray holder 8. The attachment surface 8b is lower in level than the rack receiving face 8a. A support projection 38 is formed on the receiving face 8b. The switch lever 33 has an attachment hole 33a at one end thereof. The switch lever 33 is made rotatable by inserting the support projection 38 into the attachment hole 33a. The slide rack 13 (14) is made to pass on the switch lever 33 described above.

Figure 8:
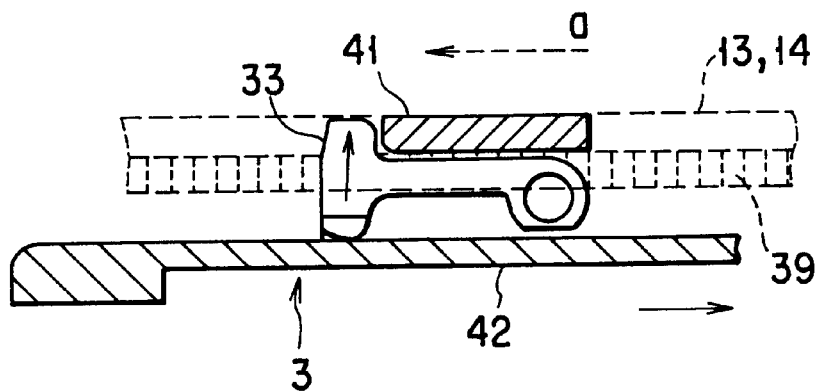
FIG. 8 is an illustration showing a state where the slide rack is locked by means of a switch lever.
Figure 9:
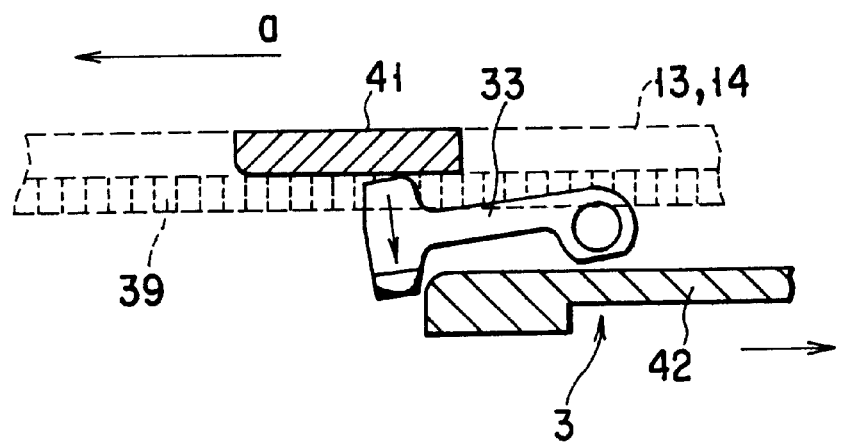
FIG. 9 is an illustration showing a state where the locked state by the switch lever has been released.

FIGS. 8 and 9 show how the switch lever 33 operates.

FIG. 8 shows the locked state of the switch lever 33. Specifically, the switch lever 33 is rotated outward, being pushed by the side portion of the lower rib 42 of the tray 3. In this state, the rib 41 of the slide rack 13 (14) is brought into engagement with the switch lever 33, thereby locking the switch lever 33. In the locked state, the slide rack 13 (14) is prevented from moving in the forward direction (i.e., the direction indicated by broken-line arrow a).

FIG. 9 shows the unlocked state of the switch lever 33. Specifically, the tray 3 is retreated, and the switch lever 33 separates from the lower rib 42 of the tray 3 and thus rotates inward. The slide rack 13 (14) and the rib 41 are disengaged from each other. Accordingly, the slide rack 13 (14) is allowed to move in the forward direction.

Figure 10:
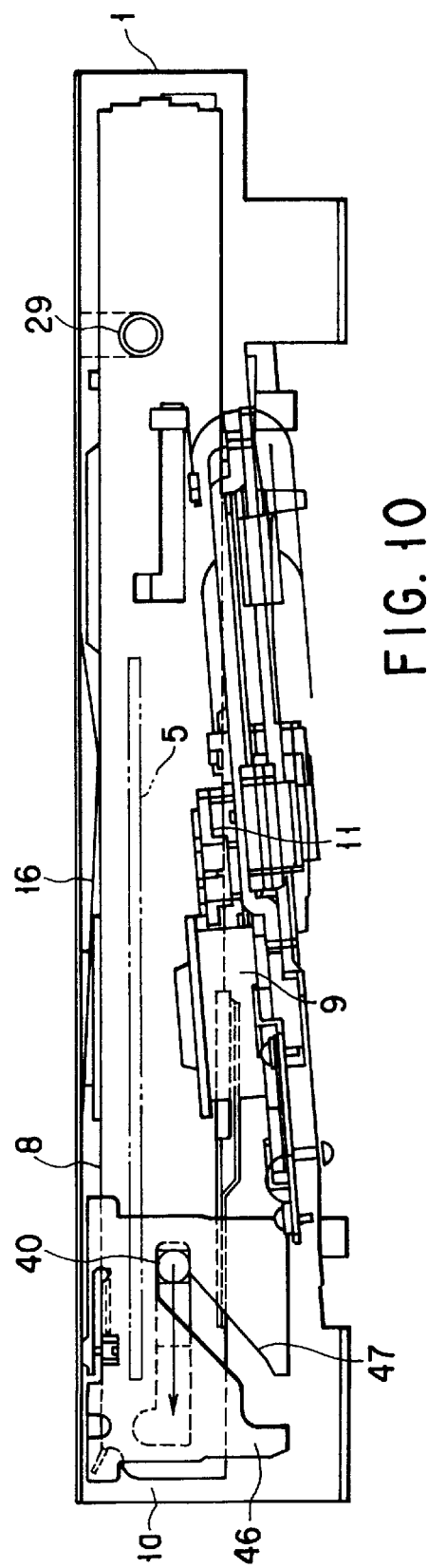
FIG. 10 shows a state where the cartridge is inserted into the apparatus while maintaining the horizontal state.

FIG. 10 shows a guide mechanism that cooperates with the slide racks 13 and 14 to serve as the swinging means of the tray holder 8.

Guide cams 46 are arranged on the respective sides of the front portion of the base chassis 1. Each guide cam 46 has a guide groove 47 which declines toward the front. The boss 40 of the slide rack 13 (14) is inserted in the guide groove 47. When the slide rack 13 (14) moves forward, the boss 40 descends along the guide groove 47. Conversely, when the slide rack 13 (14) moves backward, the boss 40 ascends along the guide groove 47. Due to the ascending or descending movement of the boss 40 of the slide rack 13 (14), the front end of the holder 8 swings within an angular range of 4.2°.

The turntable 9, the spindle motor 10 and the lens actuator 11 are slanted at an angle of 4.2°, which corresponds to the swing angle of the holder 8.

The reason for swinging the front end of the holder 8 is to permit the lens actuator assembly 11 to be arranged on the rear side of the spindle motor 10.

The cartridge 2 includes a portion handled by the user. When the cartridge 2 is placed on the tray 3, the portion in question is closer to the user, while the shutter 6 is away from the user. The lens actuator assembly 11 is not allowed to face the optical disk if it is not positioned in the rear of the spindle motor 10.

Hence, the installation space for the lens actuator assembly 11 has to be provided in the rear of the spindle motor 10. In order to enable the provision of that space, the front end of the holder 8 is made to swing.

A description will now be given as to how the cartridge 2 is inserted into the optical disk apparatus and ejected therefrom.

Figure 12:
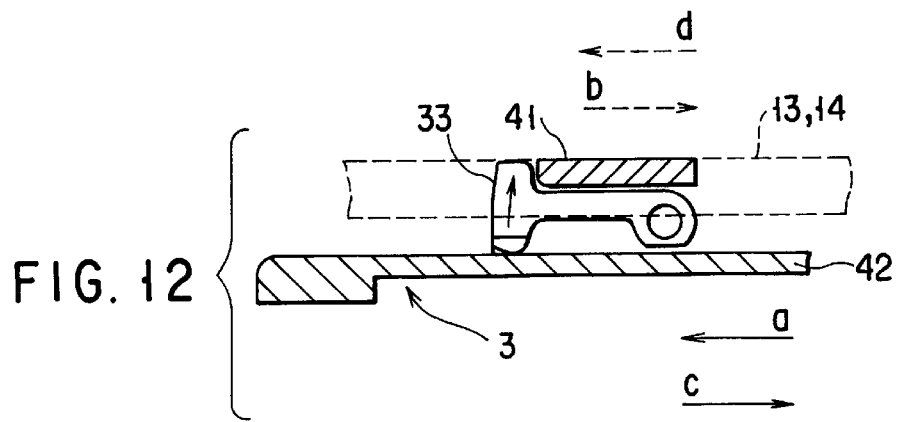
FIG. 12 shows how the switch lever is when the tray is advanced or retreated.

To insert the cartridge 2, a take-in button (not shown) is turned on. In response to this, the driving motor shown in FIG. 5 rotates in the normal direction. This rotation is transmitted to the first driving gear 23 through the gear train 22, and is further transmitted to the second driving gear 25 through the shaft 24. As shown in FIG. 12, the lower rib 42 of the tray 3 is away from the switch lever 33 then, and the rear end of the slide rack 13 (14) is in contact with a stopper (not shown). When the driving gears 23 and 25 rotate, therefore, the slide rack 13 (14) is urged in the direction indicated by broken-line arrow b. However, the movement in this direction is prohibited by the stopper. As a result, the tray 3 is advanced in the direction indicated by the solid-line arrow a, and is therefore pulled out, as shown in FIG. 1.

Figure 11:
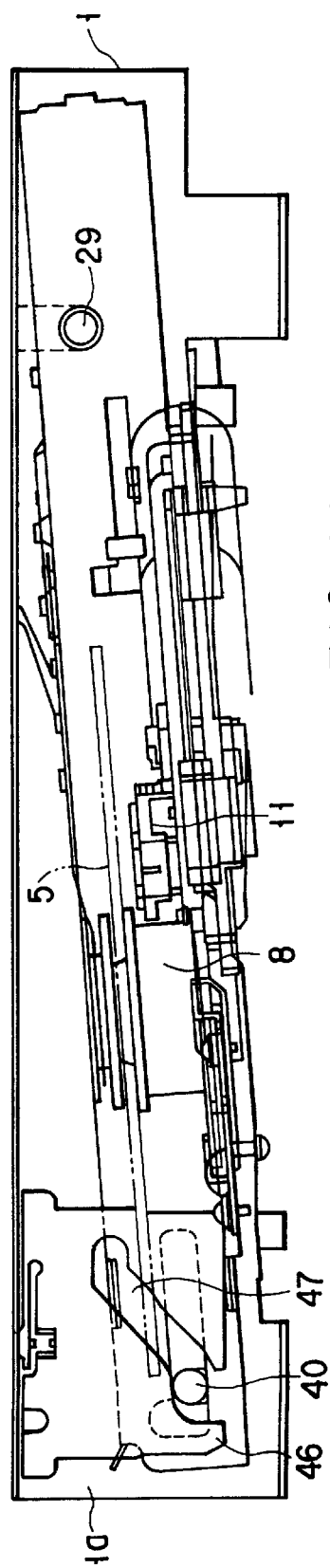
FIG. 11 shows a state where the cartridge horizontally inserted into the apparatus is rotated downward, and the optical disk is brought into engagement with a turntable.
Figure 13:
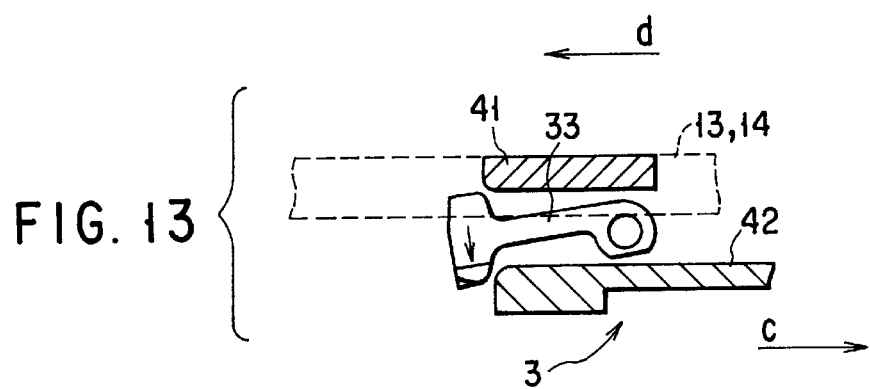
FIG. 13 shows how the switch lever is when the slide rack is advanced.

After the tray is pulled out in this manner, the cartridge 2 is placed on the tray 3, and the take-in button (not shown) is pushed again. In response to this operation, the driving motor 21 is rotated in the reverse direction. This reverse rotation is transmitted through the gear train 22 to the driving gears 23 and 25, thus rotating the driving gears in the reverse direction. The rib 41 of the slide rack 13 (14) is in engagement with the switch lever 33, so that the slide rack 13 (14) is prohibited from moving in the direction indicated by broken-line arrow d. Accordingly, the tray 3 is moved in the direction indicated by solid-line arrow c, and thus enter the apparatus. After the tray 3 is completely received in the apparatus, the switch lever 33 separates from the lower rib 42 of the tray 3 and becomes ready to rotate, as shown in FIG. 13. Since the switch lever 33 is pushed by the rib 41 of the slide rack 13 (14), it is rotated inward in the manner indicated by the solid-line arrow. As a result, the slide rack 13 (14) and the rib 41 are disengaged from each other. Due to this disengagement, the slide rack 13 (14) is advanced in the direction indicated by solid-line arrow d, and the boss 40 thereof begins to descend from the state shown in FIG. 10. To be more specific, the boss 40 descends along the guide groove 47 of the guide cam 46, as shown in FIG. 11. As a result of this descending movement, the front end portion of the tray holder 8 is rotated downward, with the boss 29 as a center.

Due to the downward rotation of the tray holder 8, the optical disk 5 in the cartridge 2 is mounted on the turntable 9 of the spindle motor 10. Then, the optical disk 5 is pushed and held by means of the clamper 17. In this state, the spindle motor 19 is driven and the optical disk 5 is spun. Simultaneous with this, the optical disk 5 is scanned with a beam radiated from the lens actuator assembly 11, for the execution of information processing.

Figure 14:
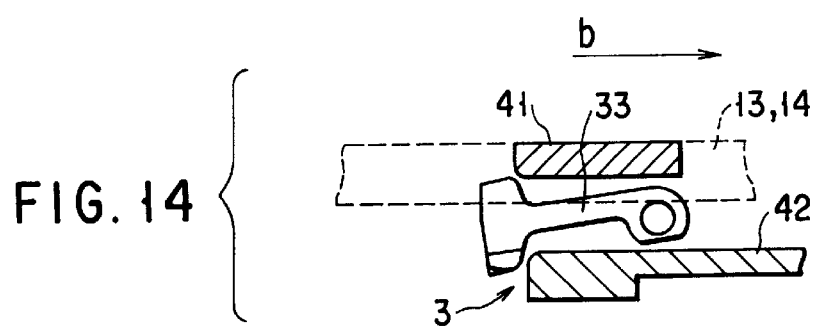
FIG. 14 shows how the switch lever is when the slide rack is retreated.
Figure 15:
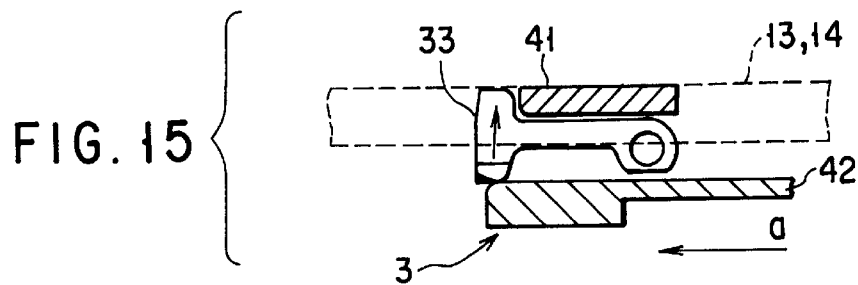
FIG. 15 shows a state where the switch lever is when the tray is advanced.

After the information processing, the cartridge 2 is taken out from the apparatus. To be specific, an eject button (not shown) is turned on. In response to this, the driving motor 21 is rotated in the normal direction, causing the slide rack 13 (14) to retreat in the manner indicated by the arrow in FIG. 14. Accordingly, the boss 40 of the slide rack 13 (14) ascends along the guide groove 47 of the guide cam 46. Due to this ascending movement, the tray holder 8 is rotated upward, with the boss 29 as a center, and becomes horizontal, as shown in FIG. 10. In this manner, the optical disk is moved up and separated from the turntable 9 of the spindle motor 10. In the meantime, the switch lever 33 disengages from the rib 41 of the slide rack 13 (14) since the slide rack 13 (14) moves in the direction indicated by arrow b. In response to the disengagement, the switch lever 33 is rotated outward, as shown in FIG. 15, by the tray which is then being advanced. As a result, the switch lever 33 separates from the lower rib 42 of the tray 3. The tray 3 is therefore advanced and pulled out from the apparatus, as shown in FIG. 1. After the tray 3 is pulled out, the cartridge 2 is picked up, and the tray is pushed in in the same manner as described above.

As described in the foregoing, the holder 8, by which the tray is moved in or out of the apparatus, is swingable, and the optical disk 5 placed on the tray 3 is brought into engagement with the turntable 9 of the spindle motor 10 by the swinging movement of the holder 8. In comparison with the conventional structure wherein a holder is moved down, with its horizontal posture maintained, and is brought into engagement with a medium-driving means, the structure provided by the present invention is advantageous in that the space required for the movement of the holder is half, which leads to a reduction in the size of the entire apparatus.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disk apparatus comprising:

a housing having an inlet/outlet port in a front surface thereof;

a holder provided inside the housing and swingably supported at one end closer to a back side of the housing by means of a supporting member;

a tray slidably held inside the holder, said tray being pulled out from the holder through the inlet/output port for placement of an optical disk cartridge, and being drawn into the holder after placement of the optical disk cartridge;

a driving unit fixed in the housing, inclined with a front end of the driving unit located at a lower position than a back end of the driving unit and configured to spin an optical disk contained in the optical disk cartridge; and a swinging device configured to swing the holder around the supporting member as a center to bring the optical disk in the cartridge into engagement with the driving device after the tray is received inside the holder.

2. An optical disk apparatus comprising:

a housing having an inlet/outlet port in a front surface thereof;

a holder provided inside the housing, and swingably supported at one end closer to a back side of the housing by means of a supporting member;

a tray held inside the holder in such a manner as to be slidable in a horizontal direction, said tray being pulled out from the holder through the inlet/output port for placement of an optical disk cartridge, and being drawn into the holder after placement of the optical disk cartridge;

a driving unit fixed in the housing, inclined with a front end of the driving unit located at a lower position than a back end of the driving unit and configured to spin an optical disk contained in the optical disk cartridge; and a swinging device configured to swing the holder around the supporting member as a center to bring the optical disk in the optical disk cartridge into engagement with the driving device after the tray is received inside the holder.

3. An optical disk apparatus comprising:

a housing having an inlet/outlet port in a front surface thereof;

a holder provided inside the housing, and swingably supported at one end closer to a back side of the housing by means of a supporting member;

a tray held inside the holder in such a manner as to be slidable in a horizontal direction, said tray being pulled out from the holder through the inlet/output port for placement of an optical disk cartridge, and being drawn into the holder after placement of the optical disk cartridge;

a driving unit fixed in the housing, inclined with a front end of the driving unit located at a lower position than a back end of the driving unit and configured to spin an optical disk contained in the optical disk cartridge; and a swinging device configured to swing the holder around the supporting member as a center to bring the optical disk in the optical disk cartridge into engagement with the driving device after the tray is received inside the holder, said driving unit being inclined at an angle corresponding to an inclination angle of the holder that is in the swung state.

4. An optical disk apparatus comprising:

a housing having an inlet/outlet port in a front surface thereof;

a holder provided inside the housing and swingably supported at one end closer to a back side of the housing by means of a supporting member;

a tray slidably held inside the holder, said tray being pulled out from the holder through the inlet/output port for placement of an optical disk cartridge, and being drawn into the holder after placement of the optical disk cartridge;

a driving unit fixed in the housing and inclined with a front end of the driving unit located at a lower position than a back end of the driving unit said driving unit including a driving motor configured to spin an optical disk contained in the optical disk cartridge and an information processor arranged in a back of the driving motor and configured to process information of the optical disk; and a swinging device configured to swing the holder around the supporting member as a center to bring the optical disk in the optical disk cartridge into engagement with the driving device after the tray is received inside the holder;

wherein the optical disk cartridge comprises an opening/closing shutter which opens when the optical disk is brought into engagement with the driving motor and thereby makes the optical disk oppose the information processor.

* * * * *